United States Patent
Bocoviz et al.

(10) Patent No.: US 10,189,561 B2
(45) Date of Patent: Jan. 29, 2019

(54) RESONATOR, AND AN AIRCRAFT PROVIDED WITH THE RESONATOR

(71) Applicant: AIRBUS HELICOPTERS, Marignane (FR)

(72) Inventors: Claude Bocoviz, Allauch (FR); Valentin Ecard, Salon de Provence (FR); Guillaume Inquiete, Aix en Provence (FR); Alain Eberhard, Velaux (FR); Laurine Tailland, Saint Julien de Peyrolas (FR)

(73) Assignee: AIRBUS HELICOPTERS, Marignane (FR)

( * ) Notice: Subject to any disclaimer, the term of this patent is extended or adjusted under 35 U.S.C. 154(b) by 83 days.

(21) Appl. No.: 15/646,423

(22) Filed: Jul. 11, 2017

(65) Prior Publication Data
US 2018/0022447 A1    Jan. 25, 2018

(30) Foreign Application Priority Data

Jul. 19, 2016  (FR) ...................................... 16 01110

(51) Int. Cl.
*B64C 27/00*    (2006.01)
*B64C 27/04*    (2006.01)
(Continued)

(52) U.S. Cl.
CPC ............ *B64C 27/001* (2013.01); *B64C 27/04* (2013.01); *F16F 7/104* (2013.01); *F16F 7/1005* (2013.01);
(Continued)

(58) Field of Classification Search
CPC ........ F16F 7/1005; F16F 7/1011; F16F 7/104; F16F 7/116; F16F 2222/08;
(Continued)

(56) References Cited

U.S. PATENT DOCUMENTS

| 2,180,795 | A | 11/1939 | Christensen |
| 4,431,148 | A | 2/1984 | Mouille |
| 4,566,703 | A | 1/1986 | Zitting |
| 5,814,963 | A | 9/1998 | Girard et al. |

(Continued)

FOREIGN PATENT DOCUMENTS

| EP | 0058117 | 8/1982 |
| FR | 2739670 | 4/1997 |
| FR | 2961570 | 12/2011 |

OTHER PUBLICATIONS

French Search Report for French Application No. FR 1601110, Completed by the French Patent Office on Apr. 13, 2017, 7 Pages.

*Primary Examiner* — Thomas W Irvin (74) *Attorney, Agent, or Firm* — Brooks Kushman P.C.

(57) ABSTRACT

A resonator provided with a heavy member comprising a casing fastened a spring blade. The heavy member comprises a set of masses that is movable in translation in said casing along a longitudinal direction. A wormscrew driven by drive means is engaged in a slider nut of said set of masses. The set of masses comprises two masses that are slidable respectively in two cylindrical spaces of the casing. Each mass presents at least two presser means interposed between the mass and the casing, each presser means comprising a groove formed in a circumference of a mass, each presser means comprising at least one resilient member arranged in said groove and a split ring pressed against the casing by said at least one resilient member of the presser means.

17 Claims, 3 Drawing Sheets

(51) Int. Cl.
*F16F 7/10* (2006.01)
*F16F 7/104* (2006.01)
*F16F 7/116* (2006.01)

(52) U.S. Cl.
CPC ............ *F16F 7/1011* (2013.01); *F16F 7/116* (2013.01); *B64C 2027/002* (2013.01); *B64C 2027/005* (2013.01); *F16F 2222/08* (2013.01); *F16F 2230/0011* (2013.01)

(58) Field of Classification Search
CPC ........... F16F 2230/0011; B64C 27/001; B64C 27/04; B64C 2027/002; B64C 2027/005
See application file for complete search history.

(56) References Cited

U.S. PATENT DOCUMENTS

| | | | |
|---|---|---|---|
| 5,954,169 A * | 9/1999 | Jensen | F16F 7/1005 188/378 |
| 6,651,988 B2 | 11/2003 | Terpay et al. | |
| 6,681,908 B2 * | 1/2004 | Davis | F16F 1/12 188/380 |
| 6,719,503 B1 * | 4/2004 | McCalmont | B23Q 11/0035 188/378 |
| 7,690,872 B2 * | 4/2010 | Hashimoto | B23Q 11/0035 188/378 |
| 7,762,177 B2 * | 7/2010 | Fischer | F15B 15/1461 277/468 |
| 8,616,353 B2 | 12/2013 | Manfredotti | |
| 9,296,476 B2 * | 3/2016 | Seifert | B64C 27/001 |
| 2006/0272498 A1 | 12/2006 | Fischer | |
| 2018/0265187 A1 * | 9/2018 | Jouve | F16F 7/1005 |

\* cited by examiner

RESONATOR, AND AN AIRCRAFT PROVIDED WITH THE RESONATOR

CROSS-REFERENCE TO RELATED APPLICATIONS

This application claims priority to French patent application No. FR 16 01110 filed on Jul. 19, 2016, the disclosure of which is incorporated in its entirety by reference herein.

BACKGROUND OF THE INVENTION

(1) Field of the Invention

The present invention relates to a resonator and to an aircraft provided with the resonator.

The present invention relates to mechanisms seeking to reduce a level of vibration. In particular, the invention relates to mechanisms for aircraft, e.g. such as rotorcraft.

(2) Description of Related Art

Specifically, by their very nature, rotorcraft are subjected to vibration that is mainly generated in natural manner by a rotary wing of the rotorcraft. The various kinds of vibration that occur can disturb the comfort of the crew and of passengers, and can degrade the condition of parts and equipment of the rotorcraft.

In order to remedy that problem, it is possible to use a vibration absorber of the resonator type. A resonator produces an anti-resonance effect at a predetermined frequency referred to as the "anti-resonant" frequency.

Conventionally, a resonator comprises a member referred to as a "seismic mass" or "moving mass" that is connected to a support via means allowing it to move such as a spring blade. The support is then attached to a vibrating structure. When the vibrating structure is subjected to vibration, the resonator is thus excited by the vibrating structure. This results in movement of the seismic mass that is intended to oppose the original vibration to which the structure is subjected.

In order to optimize the effectiveness of the resonator, the anti-resonant frequency of the resonator is adjusted so that its natural frequency becomes equal to the excitation frequency of the vibration exerted on the structure that is to be damped.

For example, rotorcraft are provided with at least one main rotor connected to an airframe. The main rotor contributes to providing the aircraft with at least part of its lift and possibly also propulsion.

The main rotor is driven in rotation by a power plant comprising at least one engine mechanically connected to a main power transmission gearbox. The main gearbox (MGB) is also provided with a rotor mast connected to the head of the main rotor. Under such circumstances, each engine drives the MGB, and the MGB drives the rotation of the main rotor.

The MGB is fastened to a support platform of the airframe by fastener elements. Such fastener elements may include suspension bars hinged to a top of the MGB.

Under such circumstances, a resonator may be interposed between each suspension bar and the support platform. For example, such a resonator includes a seismic mass that is carried by a blade. The blade extends longitudinally from a first end carrying the seismic mass towards a second end that is hinged firstly to a suspension bar and secondly to the support platform.

Certain resonators are said to be "semi-active".

A semi-active resonator makes it possible to move a seismic mass manually in translation relative to a blade in order to enable the resonator to handle vibratory phenomena occurring at various frequencies.

The resonator is thus adjusted by moving the movable seismic mass in translation relative to the blade. This movement serves in particular to modify the position of the center of gravity of the resonator, and to modify the vibratory response of the resonator on being excited.

From its environment, the seismic mass is subjected to strong accelerations at high frequencies. For example, the seismic mass may be subjected to accelerations up to a value of twenty times the acceleration due to gravity, and it may move over an amplitude of about ten centimeters.

If there is any assembly clearance in the guidance of movement in translation of such a seismic mass, then the resonator can become damaged quickly. If such a seismic mass is guided to move in translation without assembly clearance, then the resonator can become unusable because of the friction exerted on the seismic mass.

Certain resonators propose guiding a movable mass with the help of three columns extending longitudinally. The system is statically undetermined. Under such circumstances, any clearance present between the mass and the columns is difficult to control. Such clearance can be troublesome in the context of providing a suspension between an aircraft airframe and an MGB subjected to high levels of vibration. Specifically, such clearance runs the risk of leading to premature wear of the resonator.

Furthermore, it may be found difficult to install a resonator in a space that is already occupied by various other members. For example, it can be difficult to install a seismic mass of about ten kilograms for a resonator supporting an MGB.

Document FR 2 961 570 proposes a resonator having a main mass and an auxiliary mass, which masses are mounted on a support. The auxiliary mass is arranged in a casing that is fastened to the main mass. The auxiliary mass includes a threaded member arranged about a drive screw inside the casing. Manual drive means engaged with the drive screw serve to turn the drive screw (a wormscrew) so as to move the auxiliary mass in translation along the drive screw.

The auxiliary mass comprises a primary mass and a secondary mass. The secondary mass is arranged in a setback in the primary mass. The primary mass and the secondary mass have the wormscrew passing through them. Under such circumstances, the threaded member that co-operates with the wormscrew is arranged inside the secondary mass, the secondary mass being arranged inside the primary mass. At least one return means urges the primary mass away from the secondary mass in order to press them respectively against a first inside face and a second inside face of the casing.

Document FR 2 739 670 describes a resonator having an adjustment mass that is movable in translation. The adjustment mass comprises two subassemblies on a common axis.

The adjustment mass is guided in translation by skids urged by springs against a casing. The skids extend along a generator line of the adjustment mass, i.e. substantially parallel to the axis along which the adjustment mass moves in translation.

Document U.S. Pat. No. 6,651,988 is remote from the field of the invention and does not relate to a resonator. Document U.S. Pat. No. 6,651,988 describes a hydraulic actuator provided with sealing means.

Likewise, Document US 2006/272498 is remote from the field of the invention since it does not relate to a resonator. Document US 2006/272498 describes a hydraulic actuator.

Document U.S. Pat. No. 2,180,795 is likewise remote from the field of the invention since it does not relate to a resonator. Document U.S. Pat. No. 2,180,795 likewise describes a piston.

Documents U.S. Pat. No. 4,566,703 and EP 0 058 117 are also known.

BRIEF SUMMARY OF THE INVENTION

An object of the present invention is to propose an innovative resonator.

According to the invention, a resonator is provided with a heavy member and a spring blade, the heavy member comprising a casing fastened to the spring blade, the heavy member further comprising a set of masses that is movable in translation inside the casing along a longitudinal direction, the resonator including a wormscrew engaged in a slider nut of the set of masses, the resonator including drive means suitable for driving the wormscrew in rotation so that rotation of the wormscrew drives said movement in translation.

The casing presents an inside face defining in part at least two cylindrical spaces, each presenting a generator line parallel to the longitudinal direction, said two cylindrical spaces being arranged outside a central space, said wormscrew being arranged in said central space, said set of masses comprising two masses slidable respectively in said two cylindrical spaces. The set of masses includes a support carrying said slider nut, each mass comprising at least one heavy element fastened to the support. Each mass presents at least two presser means interposed between the mass and the inside face. Each presser means comprising a groove formed in a circumference of a mass, each groove describing a closed curve, each presser means comprising at least one resilient member arranged in said groove and a split ring pressed against said inside face by said at least one resilient member of the presser means, said split ring projecting in part from said groove.

For example, the blade extends longitudinally along an extension axis from a root connected to a vibrating structure towards a free end. The casing of the heavy member is then fastened to the free end.

The longitudinal direction in which the wormscrew extends is optionally parallel to the axis along which the blade extends when the blade is not bending.

Furthermore, the term "drive means suitable for driving the wormscrew in rotation" means that the drive means cause the wormscrew to rotate about the longitudinal direction in order to screw the wormscrew into or out from the slider nut.

The term "cylindrical space" designates a volume in the form of a cylinder obtained by sweeping a generator line around a closed curve.

Under such circumstances, the resonator has one mass of the invention for each cylindrical space. Each mass can move in translation in a cylindrical space of the casing. With the set of masses having two masses arranged on either side of the wormscrew and each held in a respective cylindrical space, rotation of the wormscrew cannot cause the set of masses to turn about the wormscrew. Specifically, the casing allows the set of masses only one degree of freedom to move in translation along the longitudinal direction. Consequently, rotating the wormscrew in one direction of rotation causes the set of masses to move towards the free end of the blade or else towards its root.

The heavy member may be subjected to high levels of acceleration vertically at high frequencies. Under such circumstances, the presser means serve to guide the set of masses, and in particular to guide each mass, without clearance.

Specifically, each presser means presents a resilient member describing a closed curve. The closed curve may be geometrically similar to a closed curve swept by a generator line of the cylindrical space containing the corresponding mass.

The resilient member exerts a radial force on a split ring. The term "radial" means that the resilient member exerts a force on a split ring in all directions perpendicularly to the axis along which the corresponding mass moves in translation inside the casing.

Such a radial force serves to deform the split ring so as to press it against the inside face of the casing in the assembled position, e.g. over a circular arc of at least 180 degrees.

Such a split ring may be made from a thermoplastic material so as to present a low coefficient of friction. Under such circumstances, the split ring serves to hold the corresponding mass radially in position inside the casing, while having little impact on the mass moving in translation inside the casing.

The resilient member pressing against a split ring enables the high levels of acceleration and the vertical vibration to which the mass is subjected to be absorbed. Specifically, the resilient member may be compressed or stretched as a function of the forces to which the mass is being subjected, while still keeping the split ring pressed against the casing and while maintaining clearance between the mass and the casing. Consequently, overall some clearance is present between the mass and the casing, with the exception of the zones having the split rings where that clearance is filled in by the split ring under the pressure of the resilient member. Each mass is thus suspended "dynamically" in a cylindrical space inside the casing.

Furthermore, the use of at least two presser means per mass optimizes guidance of the mass for its movement in translation.

The presser means thus make it possible to end up with a mechanical system that avoids degrading parts that are expensive, by tending at least to limit any risk of friction between the masses and the casing. For example, the resilient members may be dimensioned so as to exert a level of force on the rings that is greater than the forces to which the masses are subjected in the assembled position.

The presser means thus make it possible to avoid the masses becoming blocked inside the casing, since the flexibility provided by the resilient members makes it possible to avoid the mechanical system becoming statically undetermined.

Consequently, the resonator presents a structure that is relatively simple while enabling the set of masses to be guided.

Furthermore, the inner space of the casing presents two juxtaposed cylindrical spaces and a central space, which together form a "binocular" shape. This architecture enables the two masses to be arranged respectively in the two cylindrical spaces. This architecture serves to optimize the space occupied by the resonator in elevation, and thus to avoid the set of masses moving in rotation about the wormscrew. The resonator then does not need columns as in some of the prior art. In addition, each mass can rotate in its own cylindrical space, thus making it possible to use means for fastening the masses to the support that are relatively simple.

In addition, the simplicity of the resonator makes it relatively easy to change the split rings, the presser means, and/or the presser member during maintenance operations.

Furthermore, given the modular aspect of the movable masses, the resonator can be adjusted in force and in frequency by acting on the size, on the more or less dense material, and on the position of the movable masses. The same applies for the force exerted on the split rings, given the shape and the materials of the resilient members, or indeed of the split rings.

The resonator may also include one or more of the following characteristics.

Thus, the drive means may comprise a motor fastened to the casing.

For example, the motor may be an electric motor that drives rotation of the wormscrew about the axis along which it extends in a clockwise direction or in a counterclockwise direction in response to an order from a processor unit.

Furthermore, and by way of example, the two masses are identical and arranged transversely in symmetrical manner on either side of a plane of symmetry containing said longitudinal direction.

The two masses thus move together as a result of the wormscrew rotating, but without introducing any stresses in the resonator.

Likewise, the support may be symmetrical about this plane of symmetry.

In another aspect, at least one presser means may comprise two resilient members exerting force on a single split ring.

In another aspect, at least one and possibly each split ring extends between two ends that are circumferentially separated by a slot, said slot extending in a direction that is not parallel to said longitudinal direction.

Such a split ring thus presents a slot that is beveled, serving to guarantee that the split ring covers the resilient member at least in part over its entire circumference.

In another aspect, the support includes a central portion carrying the slider nut and two side branches extending transversely on either side of the central portion, the two masses being fastened respectively to the two side branches.

Optionally, the two side branches extend transversely and symmetrically on either side of the symmetrical portion.

The term "transversely" refers to directions that are perpendicular to the longitudinal direction.

The support structure thus makes it easy to fasten the masses to the support, e.g. merely by means of screws.

Furthermore, the central portion can co-operate with each split ring.

For example, at least one cylindrical space may be in the shape of a cylinder of circular base. Each generator line of the cylindrical space then sweeps around a closed curve forming a circle.

Each mass may be fastened to a support branch by no more than a nut-and-bolt system, leaving the mass free to rotate about an axis parallel to the axis along which the wormscrew extends. There is no longer any need for rotation to be prevented by columns.

The central portion may extend transversely between two side faces of the central portion, the two side faces respectively facing two masses, each presser means of a mass being arranged facing a side face, each side face defining part of a said cylindrical space.

Each side face thus extends in continuity with the inside face of the casing around a cylindrical space.

For example, in the context of a cylindrical space on a circular base, each side face describes a circular arc complementary to a circular arc described by the inside face of the casing.

For example, the two side faces are convex in shape and face each other.

In another aspect, at least one mass may comprise two distinct heavy elements, the two heavy elements being fastened longitudinally on either side of a branch of the support, each heavy element carrying respective presser means.

Using two heavy elements provides advantageous adjustment options, in particular.

Furthermore, the two heavy elements may be identical. Optionally, additional mass elements may serve to adjust more finely the position of the center of gravity of the resonator.

Alternatively, the two heavy elements are different, the two heavy elements extending longitudinally over two respective distances that are different.

In another aspect, the casing may be made out of a material presenting density that is less than the density of a material forming the set of masses.

The two masses and the support may be made out of high density materials, and possibly out of the same material. For example, the two masses and the support may be made out of a material known under the trademark Inermet®.

Conversely, the casing may comprise a low density alloy in order to limit its impact on the positioning of the center of gravity of the heavy member.

Under such circumstances, it is easier to adjust the resonator by moving the set of masses.

Furthermore, at least one resilient member may be a gasket constrained by said groove to exert a force in radial directions against the corresponding split ring.

The gasket may be an O-ring. Alternatively, the section of the gasket may have a variety of shapes: square, multi-lobed, circular, polymorphic.

The gasket is placed in a groove of shape that compresses the gasket a little, obliging it to exert a force against a split ring.

The gasket is flattened to a greater or lesser extent by the groove and thus serves to provide a "spring" function against the corresponding split ring. This function tends specifically to "open" the split ring so as to press it against the casing or the support.

This characteristic makes it possible to obtain a resilient member that is relatively simple and suitable for exerting a radial force that is distributed in uniform manner against a split ring.

In another aspect, the groove may present an inner space containing the gasket, the inner space extending longitudinally over a groove length and radially over a groove depth, said gasket extending longitudinally over a gasket length and radially over a gasket thickness, and said gasket thickness is greater than said groove depth.

Such a groove constrains the gasket in radial directions, i.e. in its depth direction.

In addition, or as an alternative, the groove presents an inner space containing the gasket, the inner space extending longitudinally over a groove length and radially over a groove depth, the gasket extending longitudinally over a gasket length and radially over a gasket thickness, and the gasket length at rest is less than the groove length.

Such a groove can constrain the gasket longitudinally, i.e. in its length direction, when the gasket is compressed radially so as to maximize the force exerted on a split ring by the gasket.

In another aspect, the groove presents an inner space containing the gasket and an outer space, the outer space surrounding the inner space and containing the split ring in part, the inner space extending longitudinally along an inner length that is less than an outer length along which the outer space extends.

In another aspect, the inside face may be covered in lubricant.

In a variant, the inside face of the casing may be lubricated a little in order to optimize sliding of the split rings against the casing, so as to limit wear of the drive means and of the wormscrew.

The invention also provides an aircraft including a resonator of the above-described type.

Particularly, but not exclusively, the blade of the resonator may be hinged to a suspension bar of an MGB and to a support platform.

BRIEF DESCRIPTION OF THE DRAWINGS

The invention and its advantages appear in greater detail from the context of the following description of embodiments given by way of illustration and with reference to the accompanying figures, in which.

Elements present in more than one of the figures are given the same references in each of them.

DETAILED DESCRIPTION OF THE INVENTION

Three mutually orthogonal directions X, Y, and Z are shown in some of the figures.

The first direction X is said to be longitudinal. The term "longitudinal" relates to any direction parallel to the first direction X.

The second direction Y is said to be transverse. The term "transverse" relates to any direction parallel to the second direction Y.

Finally, the third direction Z is said to be in elevation. The term "in elevation" relates to any direction parallel to the third direction Z.

Directions present in a Y,Z plane are also said to be radial relative to the longitudinal direction.

Figure 1:
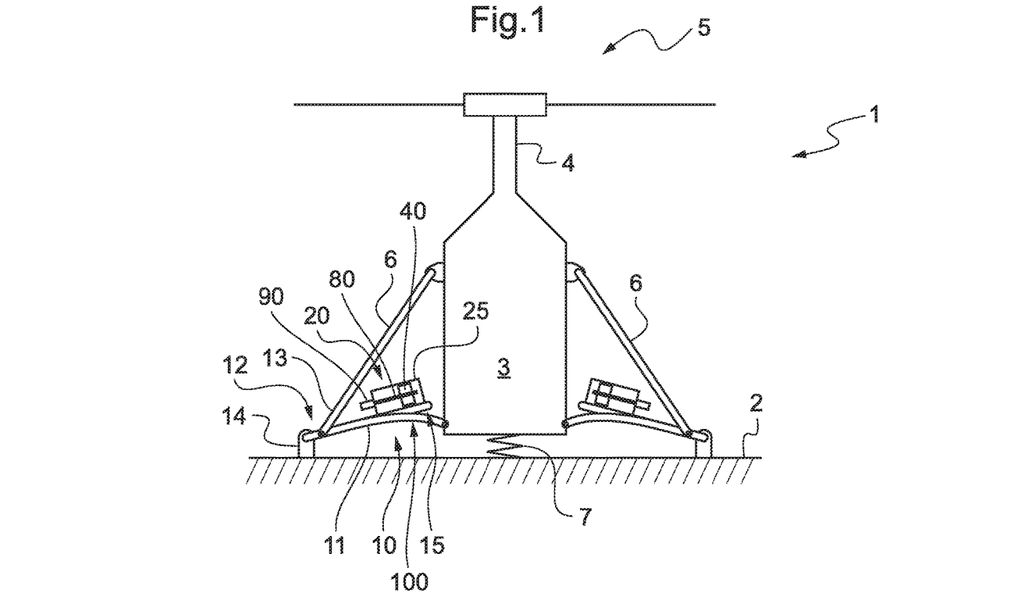
FIG. 1 is a diagram showing a resonator of the invention arranged on an aircraft.

FIG. 1 shows an aircraft 1 having at least one resonator 10 of the invention.

In particular, the aircraft 1 may have an MGB 3 with a rotor mast 4. The rotor mast 4 is constrained to rotate with a rotor 5. The rotor 5 may contribute to providing the aircraft with lift and/or propulsion and/or control. By way of example, the aircraft 1 is a rotorcraft, with the rotor 4 being a rotary wing of the rotorcraft.

The MGB is connected to at least one engine (not shown). The engine drives the MGB 3, which in turn drives rotation of the rotor mast 4 and consequently rotation of the rotor 5.

The MGB 3 is fastened to a support platform 2 by various elements. For example, a first system 7 attaches the bottom of the MGB to the platform 2.

Furthermore, suspension bars 6 are hinged to a top of the MGB 3. Under such circumstances, each bar may be attached to the platform 2 by a resonator 10 of the invention.

The resonator 10 includes a flexible blade 11. The blade 11 extends longitudinally along its axis of extension from a root 12 to a free end 15.

Under such circumstances, the root 12 may be hinged via a first conventional hinge 13 to a suspension bar 6, and via a second conventional hinge 14 to the platform 2. The first hinge 13 is arranged longitudinally between the second hinge 14 and the free end 15 as shown in FIG. 1.

In addition, a flexible blade 100 may extend from the blade 11 to the MGB 3.

Furthermore, the resonator includes a heavy member 20 fastened to the blade 11.

In particular, the heavy member 20 presents an outer casing 25 that is fastened to the free end 15 of the blade 11. The outer casing 25 receives internally a set of masses 40 that is movable in translation along a wormscrew 80 that is driven in rotation by drive means 90. For this purpose, the set of masses includes a nut referred to as a "slider" nut that is in screw engagement on the wormscrew 80.

The drive means 90 may be controlled by a conventional processor unit (not shown), and/or by a button operated by a pilot. By way of example, the processor unit may comprise a processor, an integrated circuit, a programmable system, a logic circuit, these examples not limiting the scope to be given to the term "processor unit".

In another aspect, the casing 25 may be made out of a material having lower density than the material forming the set of masses 40.

Figure 2:
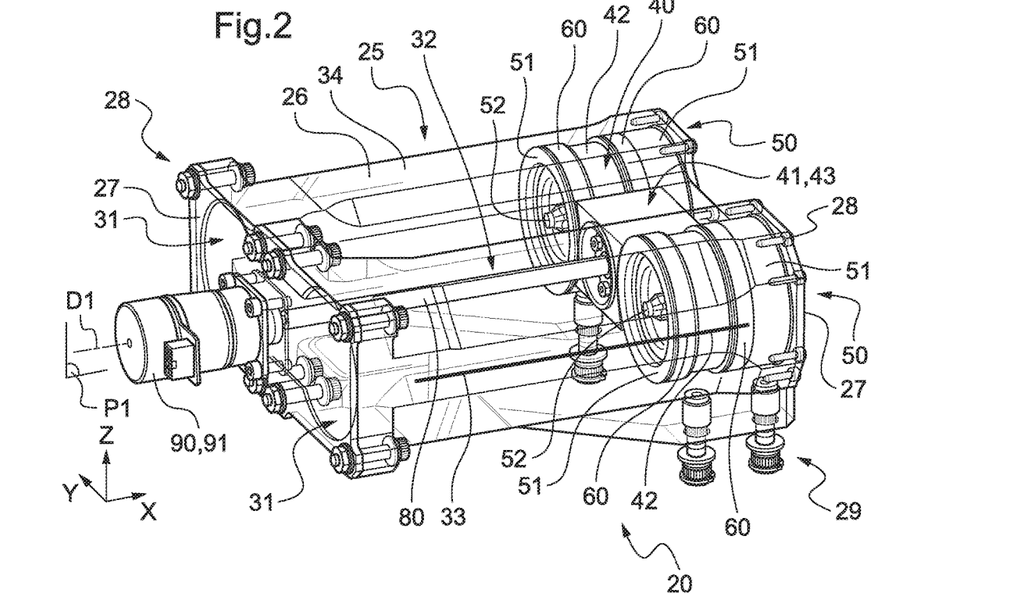
FIG. 2 is a diagram showing a heavy member of a resonator of the invention.

FIG. 2 shows a heavy member of the invention.

This heavy member thus comprises a casing 25. The casing 25 may be fastened by conventional means to the blade 11, such as screw fastener means, e.g. studs 29.

The casing 25 may have various members that are fastened to one another. For example, the casing 25 may include a central enclosure 26 extending longitudinally between two openings that are closed by end plates 27. Each end plate 27 may be attached to the central enclosure 26, e.g. by means of screws 28 or bolts.

The casing 25 presents an inside face 34 that defines a volume referred to as the "inside" volume.

The inside volume may comprise at least two cylindrical spaces 31 away from a central space 32 and possibly separated transversely by the central space 32. For example, the inside volume may comprise only two cylindrical spaces 31 arranged outside the central space 32, or separated transversely by a central space 32. For example, the two cylindrical spaces are arranged symmetrically on either side of a plane of symmetry P1 passing through the central space 32.

Under such circumstances, each cylindrical space is physically defined in part by the inside face 34. Furthermore, this cylindrical space is locally open to the central space 32.

Specifically, each cylindrical space presents a generator line 33 that is shown diagrammatically in FIG. 2. This generator line is in the form of a line segment parallel to the longitudinal direction D1. Furthermore, each cylindrical space may have a space that is circular.

Under such circumstances, the inside volume is substantially "binocular" shaped.

The wormscrew 80 then extends inside the inside volume along the longitudinal direction D1. This longitudinal direction D1 may be contained in the plane of symmetry P1.

More particularly, the wormscrew is arranged in the central space 32.

The drive means 90 may thus comprise a motor 91 carried by the casing and connected to the wormscrew 80. For example, such a motor 91 is carried by an end plate 27 and is situated outside the inside volume.

Furthermore, the set of masses 40 is engaged around the wormscrew 80, the slider nut that is carried by the set of masses being in screw engagement on the wormscrew 80.

The set of masses 40 extends transversely in each cylindrical space 31 and in the central space 32.

Specifically, the set of masses 40 comprises a support 41 that extends at least within the central space 32. The support 41 carries the slider nut that is in screw engagement on the wormscrew.

Furthermore, the set of masses 40 has one mass for each cylindrical space, i.e. two masses 50 in the example shown.

Each mass 50 is constrained to move in translation with the support 41. Under such circumstances, when the wormscrew 80 causes the support 41 to move in translation, each mass 50 is constrained to move in translation within a respective one of the cylindrical spaces.

Figures 3, 4:
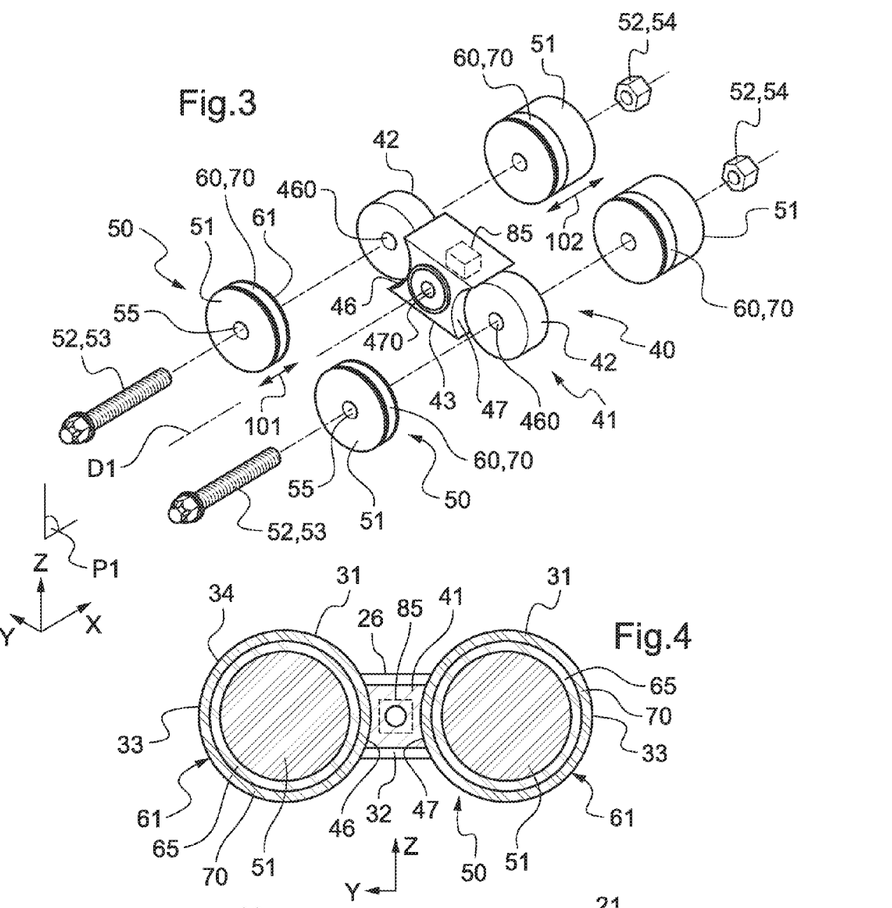
FIG. 3 is an exploded view showing a set of masses of the heavy member.
FIG. 4 is a section view through the set of masses.

FIG. 3 is an exploded view of a set of masses 40.

The support 41 presents a central portion 43 that carries the slider nut 85. The slider nut 85 is shown diagrammatically in FIG. 3 with dashed lines. This central portion 43 has an orifice 470 passing longitudinally through it along the longitudinal direction D1. The wormscrew 80 passes through this orifice so as to reach the slider nut 85.

The central portion 43 then slides in the central space of the casing.

Furthermore, the support 41 may include at least one branch for carrying the masses 50.

For example, the support 41 has one branch per mass. Under such circumstances, the support 41 shown has two side branches 42 that extend transversely on either side of the central portion 43. Each side branch 42 extends longitudinally over a length that is shorter than the length over which the central portion extends. Under such circumstances, the central portion projects longitudinally from the side branches 42, and by way of example it projects on either side of the side branches 42.

Furthermore, each branch extends in a cylindrical space and matches the shape of that cylindrical space.

Under such circumstances, each mass 50 is fastened to a side branch. For example, each side branch 42 has a longitudinal orifice 460 and each mass 50 has a longitudinal orifice 55. Under such circumstances, each mass can be fastened to a side branch by screw fastener means 52. The screw fastener means include a bolt 53 passing through the longitudinal orifice 55 of the mass and the longitudinal orifice 460 of the branch in order to be screwed into a fastener nut 54.

The two masses 50 may be identical. In another aspect, the two masses 50 may be arranged transversely in symmetrical manner on either side of the plane of symmetry P1 containing the longitudinal direction D1.

Furthermore, each mass 50 includes at least two presser means 60 interposed between the mass 50 and the inside face 34, and possibly also between the mass 50 and the central portion 43.

Each presser means 60 is thus arranged at least in part in a groove 61 arranged in the mass 50. Such a groove 61 opens out to the inside volume of the casing 25. A groove 61 may describe a closed curve, e.g. being an annular groove. Furthermore, a groove 61 may be contained in a plane perpendicular to the longitudinal direction D1.

FIG. 4 is a section view of the set of masses 40 on such a plane perpendicular to the longitudinal direction D1.

Each presser means 60 has at least one resilient member 65 arranged in the bottom of a groove 61. Furthermore, the processor means 60 are provided with a split ring 70 that surrounds the resilient member 65.

Under such circumstances, the resilient member exerts radial forces on the split ring in order to press the split ring 70 against the inside face 34 that surrounds the mass 50. The split ring 70 then projects in part outside the groove 61 in order to provide clearance between the casing 25, and thus the inside surface 34 and the mass 50.

Furthermore, the central portion 43 of the support 41 may extend transversely between two side faces 46 and 47. These two side faces 46 and 47 face two respective masses 50. Each side face 46, 47 thus defines part of a cylindrical space 31. In the context of a cylindrical space of circular base, each side face describes a circular arc situated in the extension of the circular arc described by the casing around the corresponding cylindrical space. Each side face 46, 47 thus extends an inside surface 34.

In the presence of cylindrical spaces of circular base, a mass 50 can be free to rotate about the screw fastener means 52. There is therefore no need to seek to prevent such rotation, unlike prior art column devices.

Under such circumstances, each presser means 60 may be arranged facing a side face 46, 47 so as to tend to press the split ring 70 against a side face 46, 47.

FIG. 4 also shows the slider nut 85 in screw engagement on the wormscrew. Nevertheless, such a slider nut could be located in a segment that is not in register with presser means, e.g. a segment that is in register with lateral branches of the support.

Figure 5:
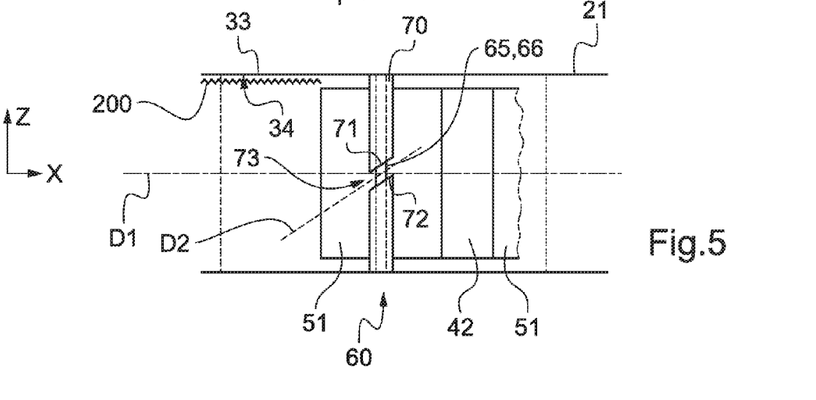
FIG. 5 is a side view showing a beveled split ring.

Furthermore, and with reference to FIG. 5, a split ring 70 extends between two ends 71 and 72. These two ends are spaced apart circumferentially by a slot 73. Advantageously, said slot 73 extends in a direction D2 of symmetry that is not parallel to the longitudinal direction D1 so as to prevent contact between the resilient member and the casing.

In another aspect, and with reference once more to FIG. 3, each mass 50 includes at least one heavy element 51 fastened to the support 41.

For example, a mass 50 may comprise two distinct heavy elements 51. Under such circumstances, the two heavy elements 51 may be fastened longitudinally on either side of a side branch 42 of said support 41.

Under such circumstances, each heavy element 51 may carry respective presser means 60.

The two heavy elements 51 may be identical.

Nevertheless, and as shown in FIG. 3, the two heavy elements 51 may be different. Consequently, the two heavy elements 51 extend longitudinally over two respective distances 101 and 102 that are different.

Furthermore, the inside face 34 may be covered in lubricant 200.

Figure 6:
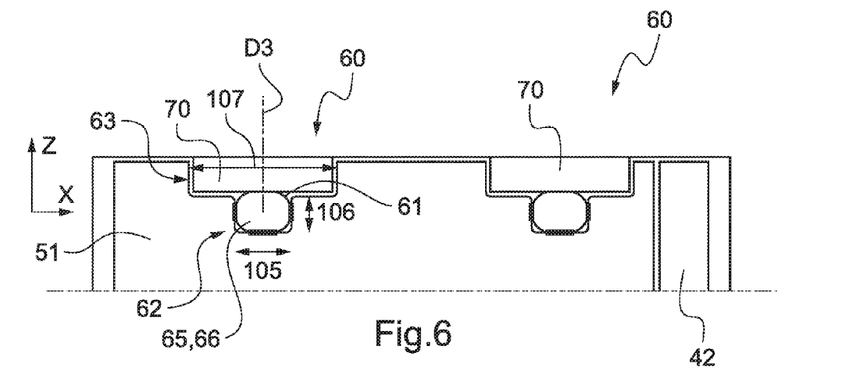
FIGS. 6 to 8 are diagrams showing pressure means comprising a split ring and a gasket.

With reference to FIG. 6, and independently of the number of heavy elements 51 in a mass 50, a resilient member 65 may be a gasket 66 constrained by the groove 61 to exert a force in radial directions D3 against the corresponding split ring 70.

For example, the groove 61 presents an inner space 62 and an outer space 63 surrounding the inner space 62. The inner space 62 may extend longitudinally over an inner length 105 that is shorter than an outer length 107 over which the outer space 63 extends.

The gasket is then arranged in the inner space, while the split ring 70 is arranged in the outer space 63.

Each inner space 62 extends longitudinally over a length referred to as the "groove" length 105, and radially over a depth referred to as the "groove" depth 106.

When the gasket 66 is not arranged in a groove, the gasket 66 is at rest and it extends longitudinally over a length referred to as the "gasket" length, and radially over a thickness referred to as the "gasket" thickness.

The gasket thickness is greater than the groove depth 106 and the gasket length is shorter than the groove length 105. When the gasket is arranged in the resonator, the gasket is compressed, at least radially.

In FIG. 6, the difference between the groove length 105 and the gasket length can be small. Under such circumstances, and in the assembled position, the gasket is flattened radially and pressed longitudinally against the walls that define the groove longitudinally.

Under such circumstances, the groove also compresses the gasket 66 longitudinally and tends to cause the gasket to move out from the inner space 62 in order to exert a considerable force against the split ring 70.

Figure 7:
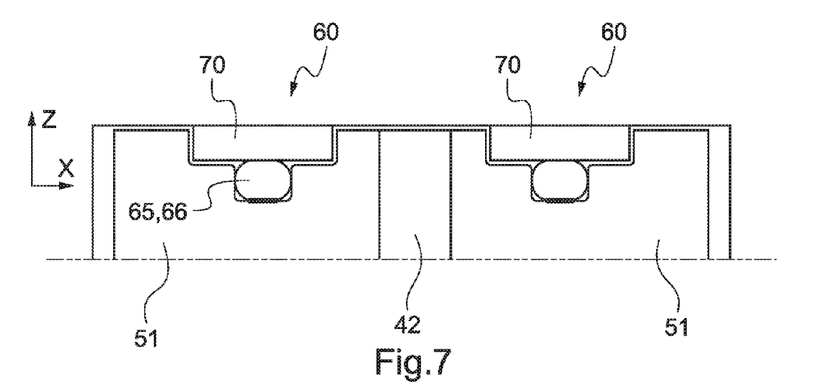

In FIG. 7, the difference between the groove length 105 and the gasket length can be considerable in order to avoid the groove exerting forces longitudinally on the gasket.

In order to obtain a considerable radial force that is exerted by the gasket against the split ring, it is preferable to use the variant of FIG. 6.

Figure 8:
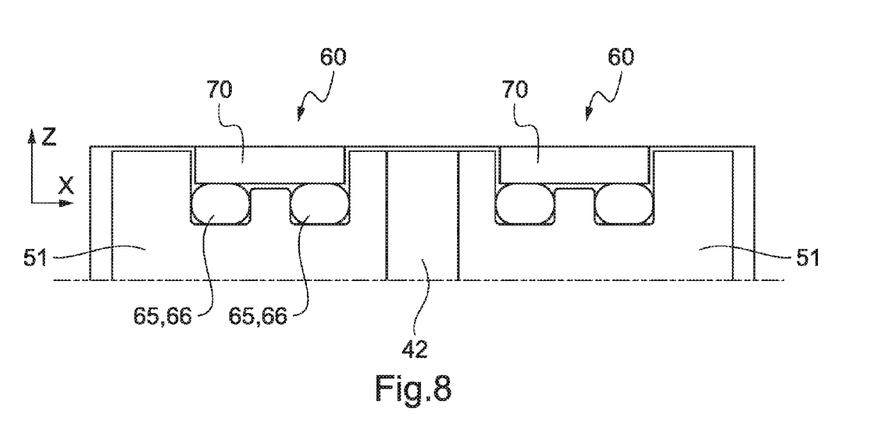

In another aspect, and with reference to FIG. 8, presser means 60 may comprise two resilient members 65 exerting force on a single split ring 70.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A resonator having a heavy member and a spring blade, the heavy member comprising a casing fastened to the spring blade, the heavy member further comprising a set of masses that is movable in translation inside the casing along a longitudinal direction, the resonator including a wormscrew engaged in a slider nut of the set of masses, the resonator including drive means suitable for driving the wormscrew in rotation so that rotation of the wormscrew drives the movement in translation, wherein the casing presents an inside face defining in part at least two cylindrical spaces each presenting a generator line parallel to the longitudinal direction, the two cylindrical spaces being arranged outside a central space, the wormscrew being arranged in the central space, the set of masses comprising two masses slidable respectively in the two cylindrical spaces, the set of masses including a support carrying the slider nut, each mass comprising at least one heavy element fastened to the support, each mass presenting at least two presser means interposed between the mass and the inside face, each presser means comprising a groove formed in a circumference of a mass and contained in a plane perpendicular to the longitudinal direction, each groove describing a closed curve, each presser means comprising at least one resilient member arranged in the groove and a split ring pressed against the inside face by the at least one resilient member of the presser means, the split ring projecting in part from the groove.

2. The resonator according to claim 1, wherein the two masses are identical and arranged transversely in symmetrical manner on either side of a plane of symmetry containing the longitudinal direction.

3. The resonator according to claim 1, wherein at least one presser means comprises two resilient members exerting force on a single split ring.

4. The resonator according to claim 1, wherein at least one split ring extends between two ends that are circumferentially separated by a slot, the slot extending in a direction that is not parallel to the longitudinal direction.

5. The resonator according to claim 1, wherein the support includes a central portion carrying the slider nut and two side branches extending transversely on either side of the central portion, the two masses being fastened respectively to the two side branches.

6. The resonator according to claim 5, wherein the central portion extends transversely between two side faces, the two side faces respectively facing the two masses, each presser means of a mass being arranged facing a side face, each side face defining part of one of the cylindrical spaces.

7. The resonator according to claim 1, wherein at least one cylindrical space is in the shape of a cylinder of circular base.

8. The resonator according to claim 1, wherein at least one mass comprises two distinct heavy elements, the two heavy elements being fastened longitudinally on either side of a side branch of the support, each heavy element carrying respective presser means.

9. The resonator according to claim 8, wherein the two heavy elements are identical.

10. The resonator according to claim 8, wherein the two heavy elements are different, the two heavy elements extending longitudinally over two respective distances that are different.

11. The resonator according to claim 1, wherein the casing is made out of a material presenting density that is less than the density of a material forming the set of masses.

12. The resonator according to claim 1, wherein at least one resilient member is a gasket constrained by the groove to exert a force in radial directions against the corresponding split ring.

13. The resonator according to claim 12, wherein the groove presents an inner space containing the gasket, the inner space extending longitudinally over a groove length and radially over a groove depth, the gasket extending longitudinally over a gasket length and radially over a gasket thickness, and the gasket thickness is greater than the groove depth.

14. The resonator according to claim 1, wherein the groove presents an inner space containing the gasket, the inner space extending longitudinally over a groove length and radially over a groove depth, the gasket extending longitudinally over a gasket length and radially over a gasket thickness, and the gasket length at rest is less than the groove length.

15. The resonator according to claim 1, wherein the inside face is covered in lubricant.

16. The resonator according to claim 1, wherein the groove presents an inner space containing the gasket and an outer space, the outer space surrounding the inner space and containing the split ring in part, the inner space extending longitudinally along an inner length that is less than an outer length along which the outer space extends.

17. An aircraft, wherein the aircraft includes the resonator according to claim 1.

* * * * *